CONNECTOR SCREEN FOR INTERCONNECTING ADJACENT SURFACES OF LAMINAR CIRCUITS AND METHOD OF MAKING

Filed Jan. 13, 1969

INVENTORS
HOWARD L. PARKS
TOME KITAGUCHI
ROBERT B. OLDER
BY Nathan Cass
ATTORNEY INVENTORS
HOWARD L. PARKS
TOME KITAGUCHI
ROBERT B. OLDER
BY Nathan Cass
ATTORNEY United States Patent Office
3,541,222
Patented Nov. 17, 1970

3,541,222
CONNECTOR SCREEN FOR INTERCONNECTING ADJACENT SURFACES OF LAMINAR CIRCUITS AND METHOD OF MAKING

Howard L. Parks, Woodland Hills, Tome Kitaguchi, Northridge, and Robert B. Older, Woodland Hills, Calif., assignors to The Bunker-Ramo Corporation, Canoga Park, Calif., a corporation of Delaware Filed Jan. 13, 1969, Ser. No. 790,722
Int. Cl. H05k *1/08*
U.S. Cl. 174—68.5 10 Claims

ABSTRACT OF THE DISCLOSURE

A connector screen for interconnecting aligned electrodes of adjacent circuit boards or modules. The connector screen comprises a matrix of spaced conductive connector elements embedded in a supporting non-conducting material with the conductive connector elements protruding from both sides thereof. The size and spacing of the connector elements are chosen so that the connector screen can be disposed between the circuit boards or modules to provide the required interconnections between the electrodes without requiring alignment of the connector screen with respect to the boards or modules. A preferred method of making the connector screen involves forming a conductive mold having a grid pattern of ridges in a non-conductive base. Conductive material is then cast between the ridges of the mold, following which selected portions of the mold are removed to form a web of non-conductive material supporting a matrix of spaced conducting elements protruding from both sides of the web.

BACKGROUND OF THE INVENTION

A major problem associated with the microelectronic art is the lack of a microcircuit interconnecting technique compatible with the many engineering and manufacturing requirements of today's programs. The most widely accepted technique of interconnecting microcircuit components in use today is the encapsulated multilayer circuit board technique. Anyone using encapsulated multilayer circuit boards is well aware of the lack of design flexibility. The design is actually frozen once fabrication starts. The completed assembly allows no change, repair or growth which can only be incorporated by complete redesign of the unit. The present trend of shortening delivery schedules, decreasing program costs, increasing system performance, and maximizing profits makes it desirable that the interconnection techniques be inherently flexible to encompass features for change, growth and reliability.

The high density packaging designs currently in use throughout the electronics industry are based on interconnection techniques with such disadvantages as high fabrication costs, special fabrication requirements resulting in expensive fabrication equipment, design inflexibility, and inability to contend with normal evolutionary circuit developments. The large-scale use of integrated circuits has compounded the problem.

One prior art solution to the above problems involves the provision of a button board system which employs a basic connecting element termed a "Fuzz Button." A "Fuzz Button" is basically a specific length of wire wadded into a ball, and which is compressed into a cylinder when in use. A typical "Fuzz Button" may, for example, be constructed from 0.002 inch diameter wire which is compressed into a cylinder of 0.047 inch in diameter by 0.047 inch in height having a typical deflection of ten percent. Typically, the "Fuzz Buttons" are compressed between the electrodes of the two circuit boards to be interconnected in special holes provided for this purpose. When the "Fuzz Button" is to be used for multilayer circuit board connections, an insulating wafer is placed between each circuit board. The insulating wafer has holes which position the "Fuzz Buttons" to provide preselected contact to circuit board surfaces and to limit the compression of the "Fuzz Buttons."

SUMMARY OF THE INVENTION

This invention relates to a novel connector screen for interconnecting electrodes upon the opposed faces of two adjacent circuit boards or modules, and to a novel method of making such a connector screen.

In one embodiment of a connector screen in accordance with the invention, a sheet of insulating material is provided containing a matrix of spaced conductive connector elements embedded in the sheet and protruding from both sides thereof. The connector elements are chosen sufficiently small compared to the electrodes of the boards so that several elements contact each pair of electrodes to be connected between opposing faces. Also, the spacing of the connector elements is chosen so that they do not produce unwanted connections to other electrodes on the boards, or to common plate material which may be provided between electrodes. Such a choice of the size and spacing for the connector elements makes it unnecessary that the connector screen be aligned with respect to the circuit boards or modules which the screen is to interconnect. The connector elements are preferably made of malleable, deformable materials so that they may be squashed when the boards or modules are pressed together, thereby ensuring good and reliable electrical contact even during heating and cooling and during vibration of the entire package.

The connector screen of the present invention is particularly useful for interconnecting the coaxial lines of coaxial circuit modules of the basic type disclosed in the commonly assigned U.S. Pat. No. 3,351,816. The connector screen of this invention may advantageously be used for interconnecting the coaxial lines of such coaxial circuit modules by providing appropriate aligned coaxial line terminations on the faces of the modules between which the connector screen is interposed, alignment of the connector screen being unnecessary.

The connector screen of this invention, thus, not only makes it possible to assemble and disassemble, for maintenance and for modification in design, complex electronic systems which may be made of many layers of solid state circuitry, printed circuits, coaxial circuitry, or the like, but also provides the important additional advantage of not requiring alignment with respect to the opposing electrodes on the modules or structures to be interconnected.

In a preferred method of making a connector screen in accordance with the invention, a mold of insulative material is formed having a grid pattern of ridges between which conductive material is cast. Selected portions of the mold are then removed to produce a web of insulating material containing a matrix of spaced conductive connector elements protruding from both sides of the web.

It is a broad object of this invention to provide a novel connector screen for interconnecting circuit boards or modules.

A more specific object of the invention is to provide a connector screen for interconnecting circuit boards or modules which does not require alignment of the connector screen with respect to the boards or modules and which permits rapid and convenient assembly and disassembly thereof.

A further object of the invention is to provide a novel method of making a connector screen in accordance with the foregoing objects.

BRIEF DESCRIPTION OF THE DRAWINGS

Other objects will become apparent from the following description, taken together with the accompanying drawings in which:

FIG. 1 is an exploded view of two adjacent modules 10 and 10' of the coaxial circuit type having respective aligned coaxial line terminals 12 and 12' on opposed faces 15 and 15'. These coaxial line terminals are interconnected by a connector screen 40 disposed therebetween in accordance with the invention. Each coaxial line terminal typically comprises an inner conductor **12*a* or 12*a'* insulated by suitable insulating material 12*b* or 12*b'*** from the common metallic surrounding portion which serves as the outer conductor for the coaxial lines.

It is to be understood that the coaxial lines of modules 10 and 10' may be constructed and arranged in basically the same manner as disclosed in the aforementioned patent. It is also to be understood that many more coaxial line terminals may be employed in addition to those illustrated in FIG. 1, and that other types of module terminals may also be advantageously interconnected in accordance with the invention.

Figure 1:
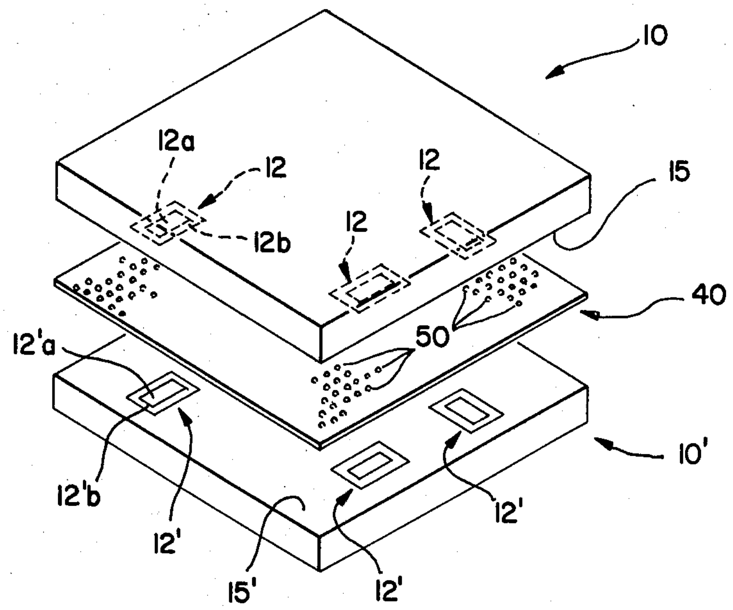
FIG. 1 is an exploded perspective view of two coaxial circuit modules having a connector screen of this invention between opposing faces thereof.
Figure 2:
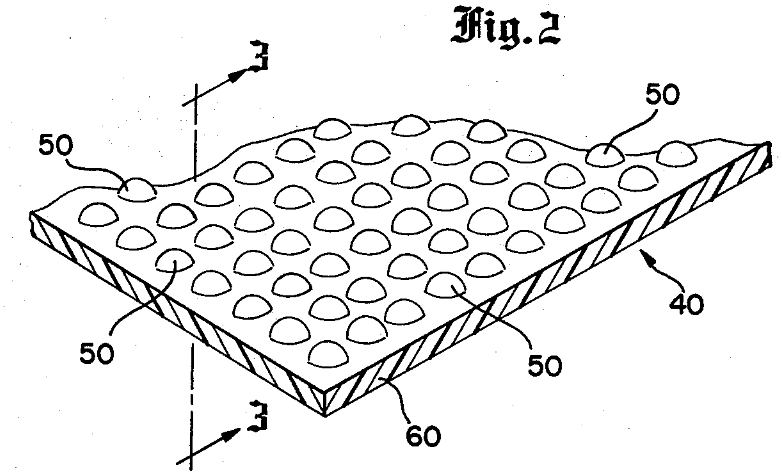
FIG. 2 is a perspective view of a portion of a connector screen in accordance with the invention.
Figure 3:
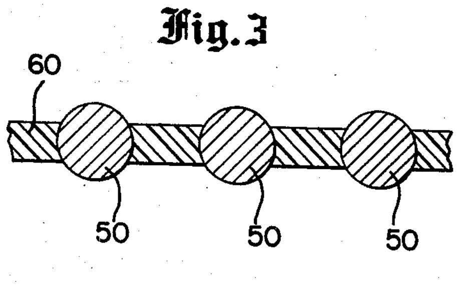
FIG. 3 is a cross-sectional view taken at 3—3 in FIG. 2.

An exemplary structure for the connector screen 40 in FIG. 1 is shown more particularly in FIGS. 2 and 3. It will be seen that the connector screen comprises a uniformly distributed matrix of spherical, preferably malleable, conductive connector elements 50 embedded in a non-conducting sheet 60 so as to protrude from both sides thereof. The sheet 60 may, for example, be made of an epoxy material. The size and spacing of the connector elements 50 are chosen so as to permit a plurality of connector elements 50 to make contact between each pair of opposing center conductors when the modules are secured together, thereby ensuring reliable connections. The size and spacing of the conductor elements are further chosen so that no shorting, voltage breakdown, or deleterious change in voltage gradient occurs between the center conductors and the surrounding metal serving as the outer conductors for the coaxial lines. It will be understood that such a choice for the connector elements 60 permits the connector screen 40 to be inserted between the modules without requiring alignment with respect thereto. Also, although there are advantages in having the connector elements 50 uniformly spaced, such is not necessary in order to practice the invention. It will be noted that the connector elements 50 also serve to interconnect the conductive faces 15 and 15' of the modules.

The connector elements 50 are preferably malleable and the modules secured so that the elements are squashed between the modules 10 and 10' to ensure good electrical contact. For example, the elements 50 could be fabricated of a lead or gold alloy which may be compressed or squashed without cracking. In such a case, the non-conductive material 60 should be sufficiently pliable so that when the connector elements 50 are squashed, the sheet 60 does not crack.

Figure 4:
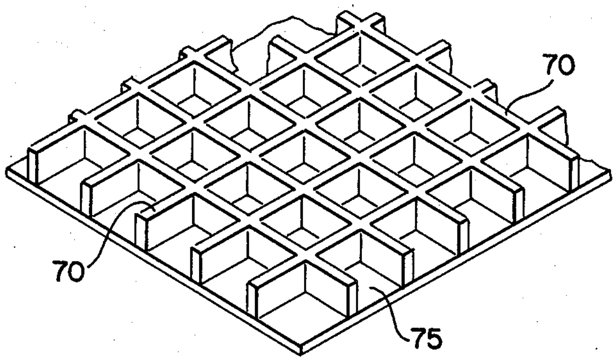
FIG. 4 is a perspective view of a portion of a non-conductive mold which is adapted to receive conductive material to fabricate a connector screen in accordance with the method of this invention.
Figure 5:
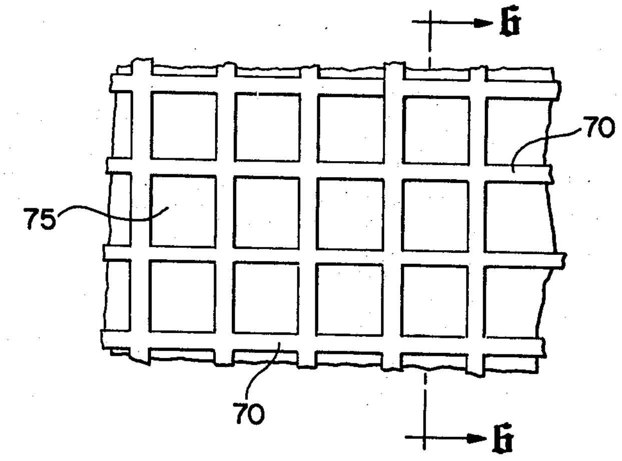
FIG. 5 is a plan view of a portion of the connector screen fabricated with the mold of FIG. 4.
Figure 6:
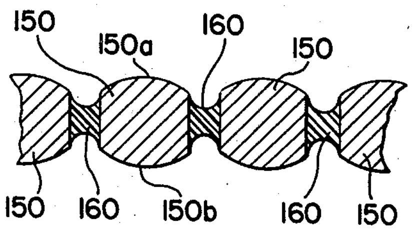
FIG. 6 is a sectional view taken at 6—6 in FIG. 5.

One preferred method of making the connector screen 40 may be understood by referring to FIGS. 4–6. A grid pattern of nonconducting ridges 70 is built up, e.g., cast, upon a base sheet 75 of non-conducting material. The resulting structure forms a mold into which metal is cast between the ridges 70. Appropriately selected portions of the ridges 70 and base sheet 75 are then chemically or mechanically removed, such as by etching or milling, leaving a web 160 of non-conducting material containing a matrix of conducting connector elements 150 with their opposite domes **150*a* and 150*b*** exposed, as shown in FIG. 6.

The embodiments of the invention in which an exclusive property or privilege is claimed are defined as follows:

1. In combination:

a plurality of at least two circuit modules having adjacent faces and conductive terminals thereon, said modules being aligned so that the conductive terminals to be interconnected on adjacent modules are opposite one another, and a connector screen disposed between the adjacent faces of said modules for electrically connecting opposed conductive terminals thereof, said connector screen being comprised of a sheet of insulative material having a large plurality of spaced conductive connector elements provided therein protruding from both sides thereof and contacting respective faces of said modules, said elements extending over a major portion of the faces thereof including portions of said faces which do not contain conductive terminals to be interconnected as well as those which do, the size and spacing of said connector elements being chosen so that a plurality of elements interconnect each pair of opposed conductive terminals, thereby making alignment of said screen with respect to said modules unnecessary.

2. The invention in accordance with claim 1, wherein said elements are made of a malleable material.

3. The invention in accordance with claim 1, wherein said elements are arranged in a uniformly spaced matrix.

4. The invention in accordance with claim 1, wherein the faces of said modules are conductive and each conductive terminal comprises a center conductor and an insulative portion insulating said conductor from its respective face.

5. The invention in accordance with claim 4, wherein the center conductors and the insulative portions on opposite faces are in substantial alignment.

6. The combination comprising:

first and second adjacent modules having opposed contact areas on adjacent surfaces thereof, each surface being conductive and including a respective insulating portion surrounding each contact area for insulation thereof from its respective conductive surface, and a sheet of non-conductive material interposed between the adjacent surfaces of said modules for electrically connecting the opposed contact areas thereof, said sheet having a plurality of substantially uniformly spaced conductive connector elements fixedly supported in and extending through said sheet from said first to said second face thereof and contacting opposite surfaces of said modules, said connector elements being spaced sufficiently close so that several elements are contained within an area of said sheet corresponding in size to one of said contact areas whereby a plurality of said elements interconnect each pair of opposed contact areas.

7. The apparatus of claim 6 wherein the maximum dimension of each of said connector elements in a direction extending substantially parallel to said first and second faces is considerably smaller than the minimum spacing between contact areas on one of said circuit modules surfaces.

8. The invention in accordance with claim 6 wherein said elements are each of spherical shape.

9. The invention in accordance with claim 8 wherein said non-conductive material is sufficiently pliable to accommodate squashing of said elements.

10. The invention in accordance with claim 6 wherein said elements are made of a malleable metal.

References Cited

UNITED STATES PATENTS

| | | | |
|---|---|---|---|
| 2,262,123 | 11/1941 | Sukumlyn | 313—65 XR |
| 2,793,178 | 5/1957 | Morris. | |
| 3,077,511 | 2/1963 | Bohrer et al. | 174—68.5 |
| 3,320,658 | 5/1967 | Bolda et al. | 174—88 XR |

FOREIGN PATENTS

| | | |
|---|---|---|
| 940,518 | 10/1963 | Great Britain. |

DARRELL L. CLAY, Primary Examiner

U.S. Cl. X.R.

29—625; 174—88; 317—101; 339—17